(12) United States Patent
Valliappan et al.

(10) Patent No.: US 11,429,394 B2
(45) Date of Patent: Aug. 30, 2022

(54) EFFICIENT MULTIPLY-ACCUMULATION BASED ON SPARSE MATRIX

(71) Applicant: Meta Platforms Technologies, LLC, Menlo Park, CA (US)

(72) Inventors: Alagappan Valliappan, Redmond, WA (US); Ganesh Venkatesh, San Jose, CA (US); Pierce I-Jen Chuang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 31 days.

(21) Appl. No.: 16/997,460

(22) Filed: Aug. 19, 2020

(65) Prior Publication Data

US 2022/0058026 A1    Feb. 24, 2022

(51) Int. Cl.
| | |
|---|---|
| *G06F 9/30* | (2018.01) |
| *G06F 17/16* | (2006.01) |
| *G06F 7/544* | (2006.01) |
| *G06F 9/38* | (2018.01) |
| *G10L 15/22* | (2006.01) |

(52) U.S. Cl.
CPC .......... *G06F 9/3893* (2013.01); *G06F 7/5443* (2013.01); *G06F 9/3001* (2013.01); *G06F 9/30036* (2013.01); *G06F 17/16* (2013.01); *G10L 15/22* (2013.01)

(58) Field of Classification Search
CPC ..... G06F 17/16; G06F 7/5443; G06F 9/30036
See application file for complete search history.

(56) References Cited

U.S. PATENT DOCUMENTS

| | | | |
|---|---|---|---|
| 2009/0300006 A1* | 12/2009 | Bose Rantham Prabhakara ......... | G06F 16/316 |
| 2015/0242484 A1* | 8/2015 | Zhao ...................... | G06F 16/22 707/755 |
| 2020/0026746 A1* | 1/2020 | Tu ............................ | G06F 17/16 |
| 2021/0073318 A1* | 3/2021 | Maiyuran ............... | G06F 17/16 |

* cited by examiner

*Primary Examiner* — Zachary K Huson
(74) *Attorney, Agent, or Firm* — Foley & Lardner LLP

(57) ABSTRACT

Disclosed herein includes improving computational efficiency of multiply-accumulate (MAC) operation. In one aspect, a computing device identifies, a first vector including non-zero elements of a base matrix, and a second vector indicating a location of each of the non-zero elements of the base matrix. In one aspect, the device determines a first element and a second element of the first vector. In one aspect, the device determines a third element and a fourth element of the second vector. In one aspect, the device determines i) a fifth element of an input vector according to the third element of the second vector, and ii) a sixth element of the input vector according to the fourth element of the second vector. In one aspect, the device causes a MAC circuitry to perform a dot product according to the first element, the second element, the fifth element, and the sixth element.

20 Claims, 9 Drawing Sheets

$$X = \begin{matrix} 0\ 0\ 0\ 0 \\ 5\ 2\ 0\ 0 \\ 0\ 0\ 3\ 0 \\ 0\ 4\ 0\ 0 \end{matrix} \implies \begin{matrix} W = 5\ 2\ 3\ 4 \\ \\ IW = 0\ 2\ 1\ 1 \\ \\ JW = 0\ 1\ 2\ 1 \end{matrix}$$

FIG. 3

EFFICIENT MULTIPLY-ACCUMULATION BASED ON SPARSE MATRIX

FIELD OF DISCLOSURE

The present disclosure is generally related to a multiply-accumulate (MAC) operation, including but not limited to improving computational efficiency of MAC operation based on a sparse matrix.

BACKGROUND

A multiply-accumulate operation is implemented in various applications. For example, a MAC operation is performed in various computing environments including, for instance, machine learning, audio processing, image processing, etc. In one aspect, a multiply-accumulate operation involves multiplying vectors, and adding multiplication results. Large number of multiplications and additions of the multiply-accumulate operation may be computationally exhaustive and can consume a lot of power.

SUMMARY

Various embodiments disclosed herein are related to a method for performing MAC operation. In some embodiments, the method includes identifying, by one or more processors, a first vector including non-zero elements of a base matrix, and a second vector indicating a location of each of the non-zero elements of the base matrix. In some embodiments, the method includes determining, by the one or more processors, a first element and a second element of the first vector. In some embodiments, the method includes determining, by the one or more processors, a third element and a fourth element of the second vector. In some embodiments, the method includes determining, by the one or more processors, i) a fifth element of an input vector according to the third element of the second vector, and ii) a sixth element of the input vector according to the fourth element of the second vector. In some embodiments, the method includes causing, by the one or more processors, a MAC circuitry to perform a dot product according to the first element, the second element, the fifth element, and the sixth element.

In some embodiments, causing, by the one or more processors, the MAC circuitry to perform the dot product includes causing, by the one or more processors, the MAC circuitry to multiply the first element and the fifth element to obtain a first multiplication result. In some embodiments, causing, by the one or more processors, the MAC circuitry to perform the dot product includes causing, by the one or more processors, the MAC circuitry to multiply the second element and the sixth element to obtain a second multiplication result. In some embodiments, causing, by the one or more processors, the MAC circuitry to perform the dot product includes causing, by the one or more processors, the MAC circuitry to add the first multiplication result and the second multiplication result.

In some embodiments, the third element of the second vector indicates a location of at least one of the first element of the first vector or the fifth element of the input vector. In some embodiments, the method includes partitioning, by the one or more processors, a matrix into two or more sub-matrices. The base matrix may be one of the two or more sub-matrices. In some embodiments, the method includes causing, by the one or more processors, another MAC circuitry to perform an additional dot product according to two elements in another one of the two or more sub-matrices, while the MAC circuitry performs the dot product according to the first element, the second element, the fifth element, and the sixth element.

In some embodiments, the method includes identifying, by the one or more processors, a third vector indicating a number of non-zero elements for each row of the base matrix. In some embodiments, the input vector corresponds to audio stream data of a speech. In some embodiments, the method includes generating, by the one or more processors, text corresponding to the speech, according to the dot product. In some embodiments, the input vector corresponds to text. In some embodiments, the method includes generating, by the one or more processors, audio stream data of a speech corresponding to the text, according to the dot product.

Various embodiments disclosed herein are related to a system for performing MAC operation. In some embodiments, the system includes one or more processors configured to identify a first vector including non-zero elements of a base matrix, and a second vector indicating a location of each of the non-zero elements of the base matrix. In some embodiments, the one or more processors are configured to determine a first element and a second element of the first vector. In some embodiments, the one or more processors are configured to determine a third element and a fourth element of the second vector. In some embodiments, the one or more processors are configured to determine i) a fifth element of an input vector according to the third element of the second vector, and ii) a sixth element of the input vector according to the fourth element of the second vector. In some embodiments, the system includes a MAC circuitry configured to perform a dot product according to the first element, the second element, the fifth element, and the sixth element.

In some embodiments, the MAC circuitry is configured to perform the dot product by multiplying the first element and the fifth element to obtain a first multiplication result. In some embodiments, the MAC circuitry is configured to perform the dot product by multiplying the second element and the sixth element to obtain a second multiplication result. In some embodiments, the MAC circuitry is configured to perform the dot product by adding the first multiplication result and the second multiplication result.

In some embodiments, the third element of the second vector indicates a location of at least one of the first element of the first vector or the fifth element of the input vector. In some embodiments, the one or more processors are configured to partition a matrix into two or more sub-matrices. The base matrix may be one of the two or more sub-matrices. In some embodiments, the system includes another MAC circuitry configured to perform an additional dot product according to two elements in another one of the two or more sub-matrices, while the MAC circuitry performs the dot product according to the first element, the second element, the fifth element, and the sixth element.

In some embodiments, the one or more processors are configured to identify a third vector indicating a number of non-zero elements for each row of the base matrix. In some embodiments, the input vector corresponds to audio stream data of a speech. The one or more processors may be configured to generate text corresponding to the speech, according to the dot product. In some embodiments, the input vector corresponds to text. The one or more processors may be configured to generate audio stream data of a speech corresponding to the text, according to the dot product.

Various embodiments disclosed herein are related to a non-transitory computer readable medium storing instructions for performing MAC operation. In some embodiments, the instructions when executed by one or more processors cause the one or more processors to identify a first vector including non-zero elements of a base matrix, and a second vector indicating a location of each of the non-zero elements of the base matrix. In some embodiments, the instructions when executed by the one or more processors cause the one or more processors to determine a first element and a second element of the first vector. In some embodiments, the instructions when executed by the one or more processors cause the one or more processors to determine a third element and a fourth element of the second vector. In some embodiments, the instructions when executed by the one or more processors cause the one or more processors to determine i) a fifth element of an input vector according to the third element of the second vector, and ii) a sixth element of the input vector according to the fourth element of the second vector. In some embodiments, the instructions when executed by the one or more processors cause a MAC circuitry to perform a dot product according to the first element, the second element, the fifth element, and the sixth element.

In some embodiments, the instructions when executed by the one or more processors that cause the MAC circuitry to perform the dot product includes instructions when executed by the one or more processors cause the MAC circuitry to multiply the first element and the fifth element to obtain a first multiplication result. In some embodiments, the instructions when executed by the one or more processors that cause the MAC circuitry to perform the dot product includes instructions when executed by the one or more processors cause the MAC circuitry to multiply the second element and the sixth element to obtain a second multiplication result. In some embodiments, the instructions when executed by the one or more processors that cause the MAC circuitry to perform the dot product includes instructions when executed by the one or more processors cause the MAC circuitry to add the first multiplication result and the second multiplication result.

In some embodiments, the third element of the second vector indicates a location of at least one of the first element of the first vector or the fifth element of the input vector. In some embodiments, the non-transitory computer readable medium further includes instructions when executed by the one or more processors cause the one or more processors to partition a matrix into two or more sub-matrices. The base matrix may be one of the two or more sub-matrices. In some embodiments, the non-transitory computer readable medium further includes instructions when executed by the one or more processors cause another MAC circuitry to perform an additional dot product according to two elements in another one of the two or more sub-matrices, while the MAC circuitry performs the dot product according to the first element, the second element, the fifth element, and the sixth element.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 3 shows an example of converting a sparse matrix into a set of vectors in a compressed sparse row (CSR) representation, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for improving computational efficiency of MAC operation based on a sparse matrix.

A. Environment for Artificial Intelligence Related Processing

Figure 1A:
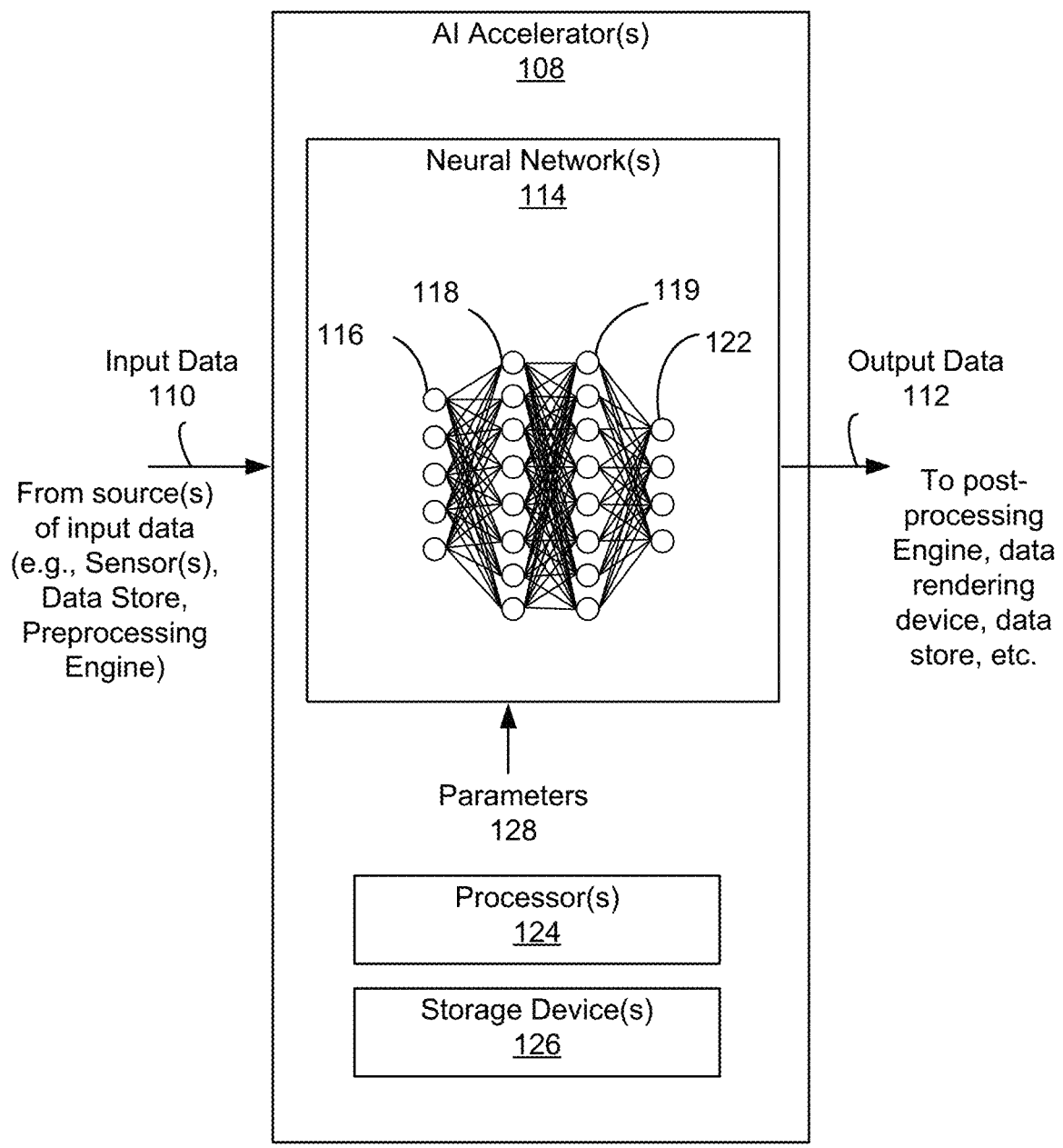
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
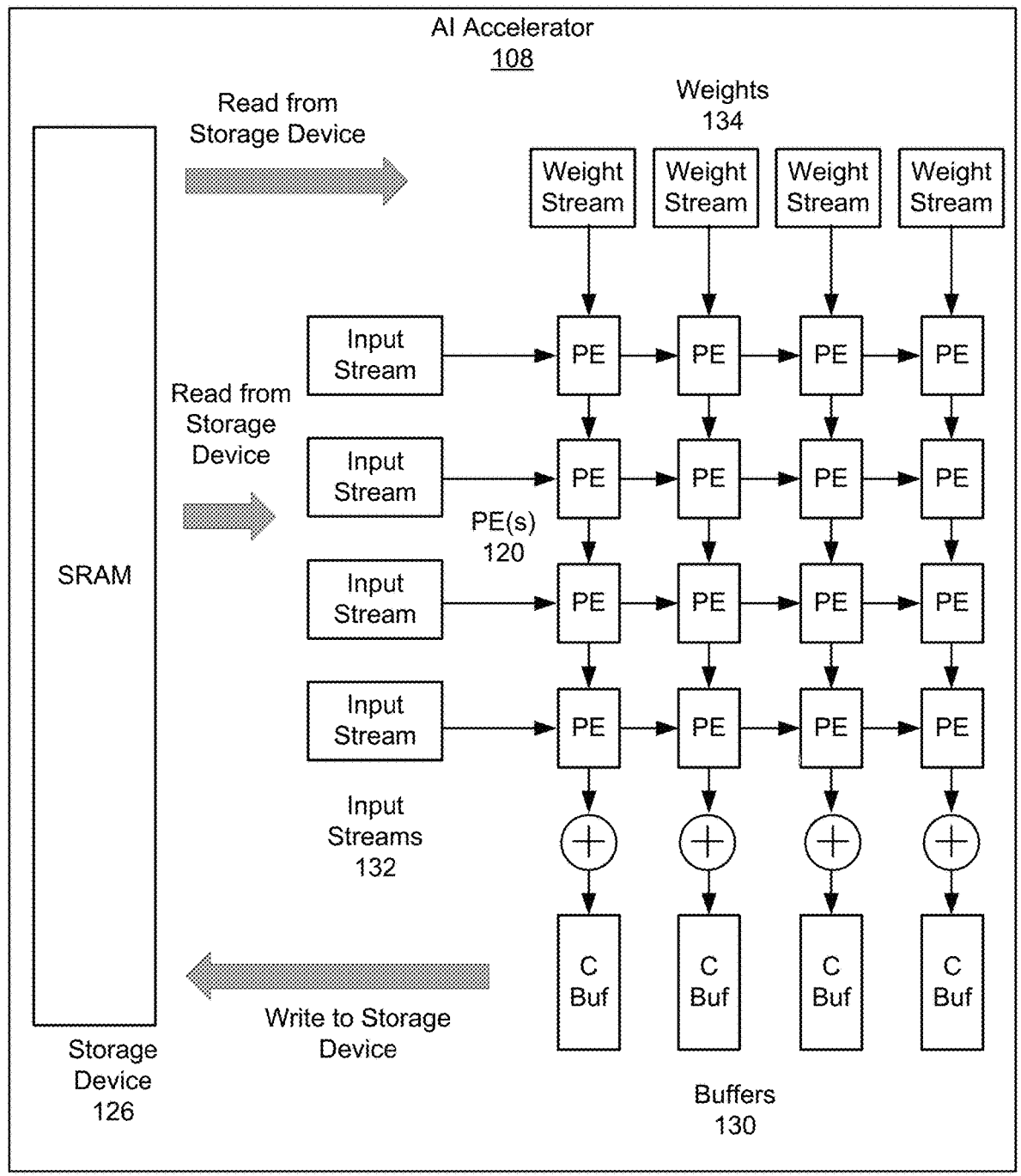
FIG. 1B is a block diagram of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \qquad (1)$$

$$y = \sigma(\zeta) \qquad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \qquad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hard-wired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
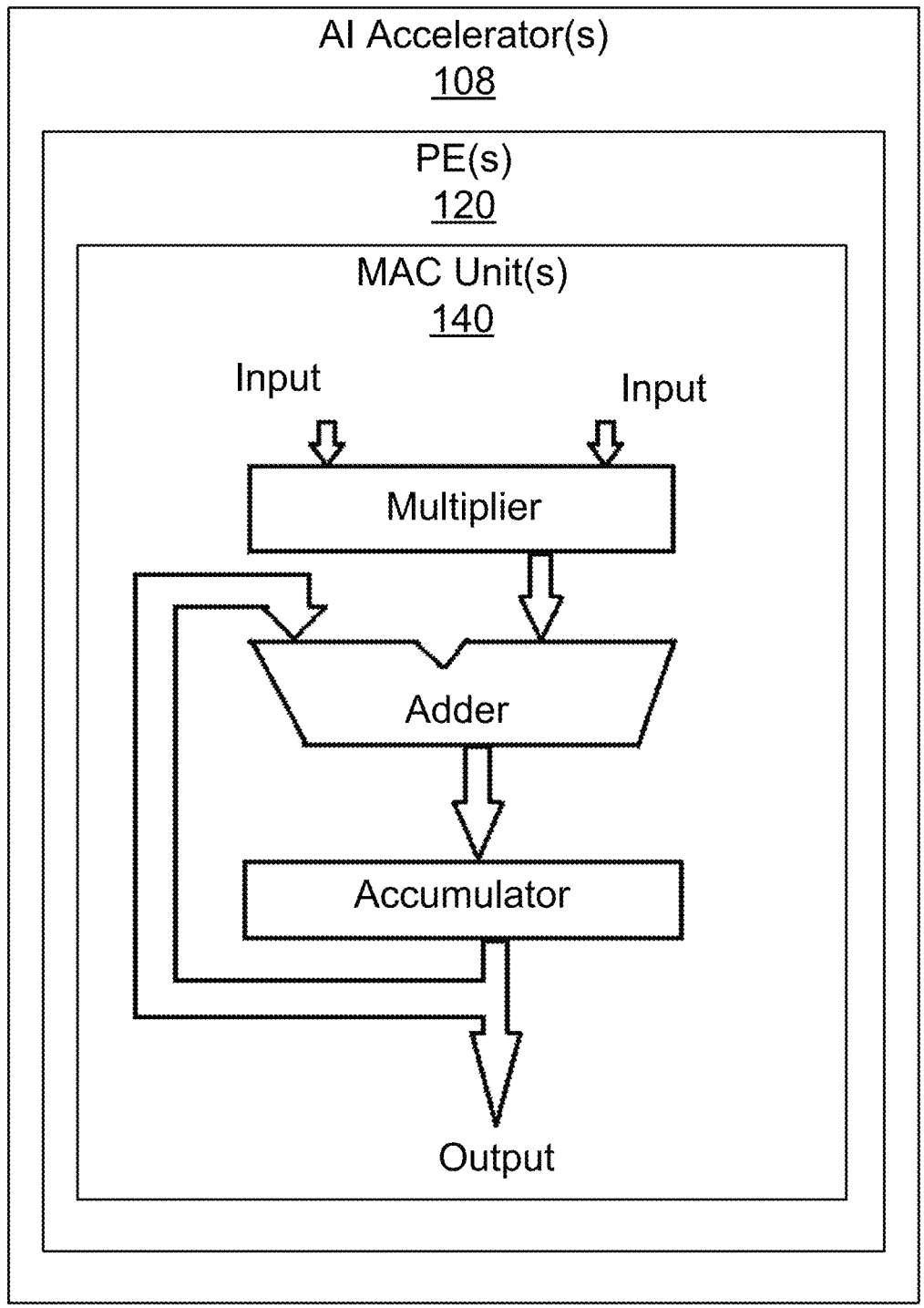
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a+(b \times c) \tag{4}$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
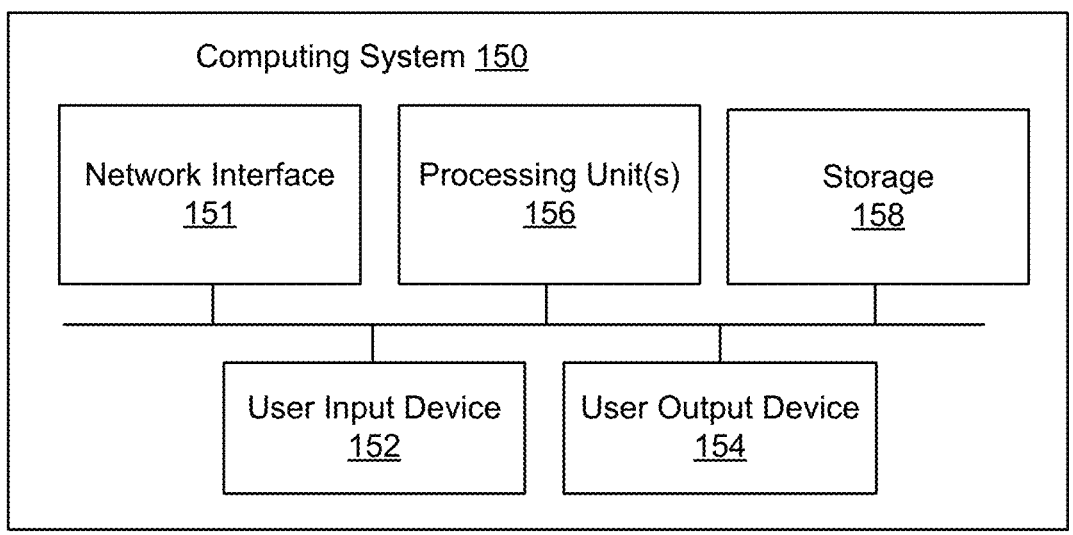
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Devices, Systems and Methods for Improving Computational Efficiency of MAC Operation Based on a Sparse Matrix Disclosed herein include embodiments of a system, a method, and a device for improving computational efficiency of MAC operations on a sparse matrix. In one aspect, a MAC operation is performed to support or implement artificial intelligence, artificial reality (e.g., virtual reality, augmented reality, mixed reality, etc.), speech-to-text conversion application, image processing, etc.

In some embodiments, a MAC operation is performed according to a set of vectors representing a base matrix. For example, a first vector includes non-zero elements of the base matrix, and a second vector indicates a location of each of the non-zero elements of the base matrix. In one approach, a first element and a second element of the first vector are determined, and a third element and a fourth element of the second vector are determined. According to the third element of the second vector, a fifth element of an input vector can be determined. Similarly, according to the fourth element of the second vector, a sixth element of the input vector can be determined. In one approach, a MAC circuitry (e.g., MAC circuitry 140) can perform a MAC operation (or a dot product operation) according to the first element, the second element, the fifth element, and the sixth element. For example, the MAC circuitry can multiply the first element and the fifth element to obtain a first multiplication result and multiply the second element and the sixth element to obtain a second multiplication result. Then, the MAC circuitry can add the first multiplication result and the second multiplication result.

Advantageously, the disclosed system and method can achieve computational efficiency by reducing a number of computations (e.g., multiplications and accumulations) of MAC operations. In one implementation, matrix multiplications for a matrix including a large number of elements (e.g., over thousand) may include a large number of multiplications and additions. In one aspect, sparsity of a matrix is exploited to reduce a number of computations. For example, a base matrix is converted into a set of vectors representing the base matrix, for example, in a CSR representation. According to the set of vectors representing the base matrix, MAC operations can be selectively performed for non-zero elements of the base matrix without performing a full matrix multiplication. Accordingly, a fewer number of MAC operations can be performed by obviating MAC operations associated with zero-elements of the base matrix. By reducing a number of MAC operations, matrix multiplications can be performed in a prompt manner (e.g., in real time) with power savings.

In one approach, the disclosed system and method can perform MAC operations in a parallel or pipeline configuration. For example, a matrix can be divided into a plurality of sub-matrices, and each sub-matrix can be converted into a corresponding set of vectors. Then, MAC operations can be performed for each sub-matrix in a parallel or pipeline configuration. Through parallel processing, time consumed for performing matrix multiplication can be further reduced.

Figure 2:
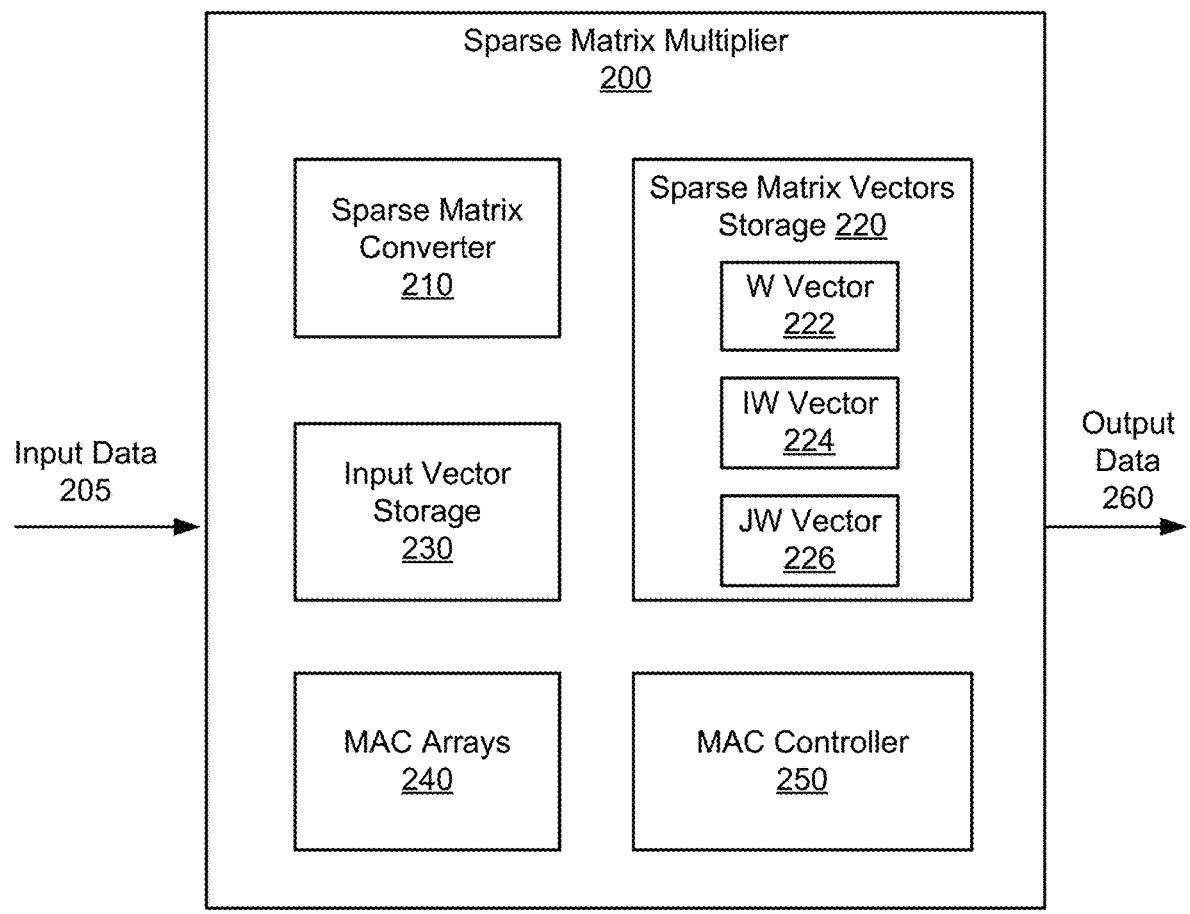
FIG. 2 is a block diagram of a sparse matrix multiplier, according to an example implementation of the present disclosure.

Referring to FIG. 2, illustrated is a block diagram of a sparse matrix multiplier 200, according to an example implementation of the present disclosure. In some embodiments, the sparse matrix multiplier 200 includes or is embodied as the system of FIG. 1A. In some embodiments, the sparse matrix multiplier 200 includes a sparse matrix converter 210, sparse matrix vectors storage 220, input vector storage 230, MAC arrays 240, and/or a MAC controller 250. Each of the components disclosed herein is implemented in hardware or at least a combination of hardware and software. In some embodiments, the MAC controller 250 is embodied as a logic circuit. In some embodiments, the MAC controller 250 is embodied as one or more processors and non-transitory computer medium storing instructions executable by the one or more processors to perform various functions or processes described herein. In other embodiments, the sparse matrix multiplier 200 includes more, fewer or different components than shown in FIG. 2. These components may operate together to receive an input data 205 and perform a matrix multiplication based on sparsity of a matrix to generate an output data 260. For example, the sparse matrix multiplier 200 receives an audio stream data of a speech as an input data 205, and performs matrix multiplication based on sparsity of a matrix to generate text corresponding to the speech as the output data 260. In some embodiments, the sparse matrix multiplier 200 may perform additional processing (e.g., filtering, etc.) on the matrix multiplication result to generate the output data 260. In some embodiments, the sparse matrix multiplier 200 can be implemented for different applications (e.g., artificial reality, machine learning, image processing, etc.).

In some embodiments, the sparse matrix converter 210 corresponds to or includes a component that converts X matrix (also referred to as "base matrix") into a set of vectors based on a sparsity of the X matrix. The X matrix may include elements, based on which MAC operation (e.g., dot product operations) can be performed with an input vector of the input data 205 to generate the output data 260. The X matrix may be predetermined or periodically adjusted. In one aspect, the set of vectors represents the X matrix with fewer elements or dimensions according to non-zero elements of the X matrix. In one example, the sparse matrix converter 210 determines or generates the set of vectors representing the X matrix in a CSR format. For example, the sparse matrix converter 210 detects non-zero elements of the X matrix, and generates W vector 222 including non-zero elements of the X matrix. For example, the sparse matrix converter 210 generates IW vector 224 indicating a number of non-zero elements for each row of the X matrix, and generates JW vector 226 indicating a location (e.g., column) of each of the non-zero elements of the X matrix. The sparse matrix converter 210 may store the W vector 222, IW vector 224, and JW vector 226 by storage matrix vectors storage 220. Examples vectors corresponding to or representing a sparse matrix are provided below with respect to FIG. 3. An example process of generating vectors corresponding to or representing the sparse matrix is provided below with respect to FIG. 4.

In some embodiments, the sparse matrix converter 210 divides or partitions the X matrix into a plurality of sub-matrices, and generates, for each sub-matrix, a corresponding set of vectors. For example, the sparse matrix converter 210 generates a first sub-matrix $X_1$ of the X matrix and a second sub-matrix $X_2$ of the X matrix. Then, the sparse matrix converter 210 may generate a first set of vectors $W_1$, $IW_1$, $JW_1$ representing the first sub-matrix $X_1$ and a second set of vectors $W_2$, $IW_2$, $JW_2$ representing the second sub-matrix $X_2$. By dividing or partitioning the X matrix into a plurality of sub-matrices and generating, for each sub-matrix, a corresponding set of vectors, MAC operations can be performed in a parallel or pipeline configuration.

In some embodiments, the input vector storage 230 includes or corresponds to a component that stores an input vector of the input data 205. The input vector storage 230 may be implemented as a buffer or a queue. The input data 205 may include audio stream data representing a speech or a vocal output. In one aspect, the input vector storage 230 can receive an address of an element of the input vector stored, and can return the element associated with the address. For example, the input vector storage 230 may receive an element of the JW vector 226 indicating a location of a non-zero element of X matrix as an input address, and return an element of the input vector associated with the element of the JW vector 226. Hence, a non-zero element of X matrix and a corresponding element of an input vector to perform a MAC operation can be obtained.

The MAC arrays 240 may include arrays of MAC units 140. The MAC controller 250 can be or include a component that configures the MAC arrays 240 to perform MAC operations. The MAC controller 250 may obtain elements of the W vector 222, and corresponding elements of the input vector, and apply the obtained elements as inputs to the MAC arrays 240 to perform a MAC operation (e.g., dot product operation). In some embodiments, the MAC controller 250 stores mapping information indicating associated MAC operation results to add or accumulate. According to the mapping information, the MAC controller 250 may configure the MAC arrays 240 to add or accumulate MAC operation results. For example, the MAC controller 250 may identify, according to the IW vector 224 indicating a number of non-zero elements in the X matrix for each row, non-zero elements of the X matrix for a row, and add or accumulate MAC operations results performed for the non-zero elements for the same row. The MAC controller 250 may configure different MAC units 140 to perform MAC operations simultaneously or in parallel. In some embodiments, the MAC controller 250 includes or implements a variable reduction tree to allow accumulation of 1, 2, 4, 8 or 16 results in parallel to support structured sparsity in the form of 1×16, 2×8, 4×4, 8×2 or 16×1 blocks. Alternatively or additionally, the MAC controller 250 may configure the same MAC unit 140 to perform MAC operations at different times (e.g., sequentially). By reusing the same hardware component, computational resource may be conserved.

In some embodiments, the MAC controller 250 can receive input data in different formats (e.g., non-sparse matrix, dense matrix, vector input, etc.). One of the inputs can be a sparse matrix stored in CSR format and other inputs can be a regular dense matrix or vector. The MAC controller 250 may obtain content according to the input data, and apply or use the content to obtain additional or subsequent content.

Referring to FIG. 3, illustrated is an example of converting a sparse X matrix into a set of vectors in a compressed sparse row (CSR) representation, according to an example implementation of the present disclosure. In the example shown in FIG. 3, the X matrix has a first row [0000], a second row [5200], a third row [0030], and a fourth row [0400]. The sparse matrix converter 210 may detect non-zero elements, and generate W vector [5234] including non-zero elements of the X matrix. The sparse matrix converter 210 may also generate IW vector [0211] indicating, for each row of the X matrix, a number of non-zero elements. The sparse matrix converter 210 may also generate JW vector [0121] indicating, for each element of the W vector, a location (e.g., column) in the X matrix. By utilizing the set of vectors representing the X matrix based on sparsity, MAC operations can be selectively performed for non-zero elements of the X matrix without performing a full matrix multiplication. Accordingly, a fewer number of MAC operations can be performed by obviating MAC operations associated with zero-elements of the base matrix.

Figure 4:
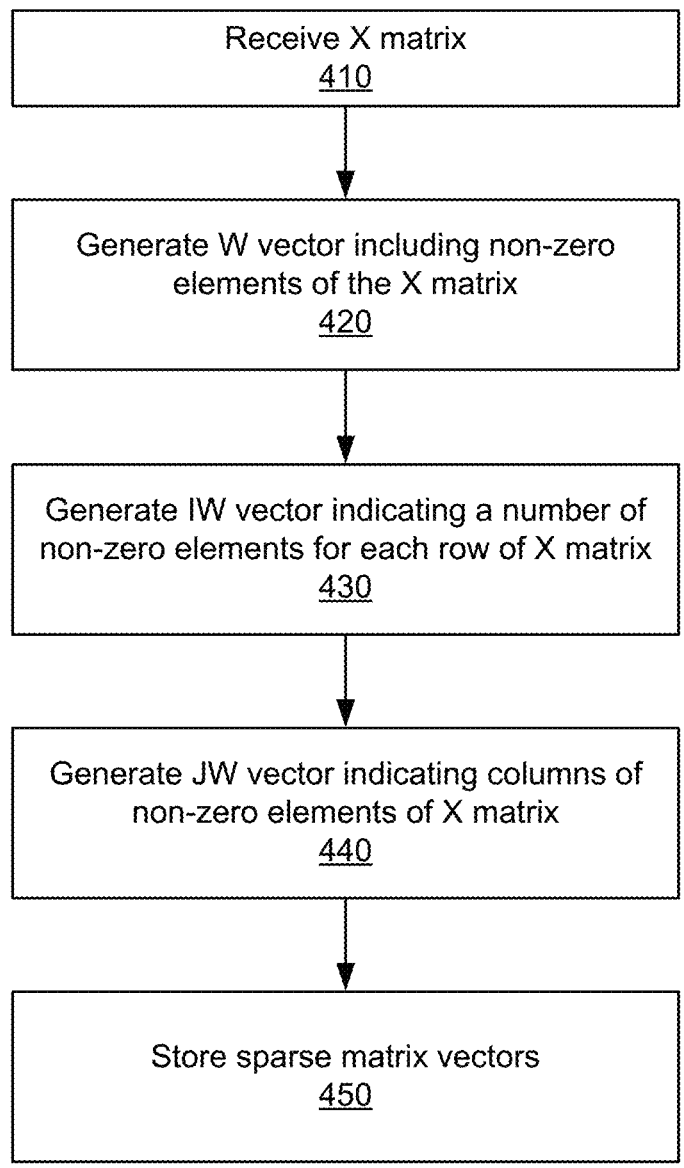
FIG. 4 is a flow chart illustrating a process of converting a sparse matrix into a set of vectors in a CSR representation, according to an example implementation of the present disclosure.

Referring to FIG. 4, illustrated is a flow chart illustrating a process 400 of converting a sparse matrix into a set of vectors in a CSR representation, according to an example implementation of the present disclosure. In some embodiments, the process 400 is performed by the sparse matrix converter 210 of FIG. 2. In some embodiments, the process 400 is performed by other entities. In some embodiments, the process 400 includes more, fewer, or different steps than shown in FIG. 4.

In one approach, the sparse matrix converter 210 receives 410 X matrix, based on which a matrix multiplication can be performed. In one approach, the X matrix can be predetermined for performing a corresponding operation (e.g., speech-to-text conversion). In one approach, the X matrix can be modified periodically or upon a user request.

In one approach, the sparse matrix converter 210 generates 420 W vector including non-zero elements of the X matrix. In one approach, the sparse matrix converter 210 generates 430 IW vector indicating a number of non-zero elements for each row of X matrix. In one approach, the sparse matrix converter 210 generates 440 JW vector indicating locations (e.g., columns) of non-zero elements of the X matrix. Assuming for an example that the X matrix has a first row [0000], a second row [5200], a third row [0030], and a fourth row [0400]. The sparse matrix converter 210 may detect non-zero elements, and generate W vector [5234] including non-zero elements of the X matrix. The sparse matrix converter 210 may also generate IW vector [0211] indicating, for each row of the X matrix, a number of non-zero elements. The sparse matrix converter 210 may also generate JW vector [0121] indicating, for each element of the W vector, a location (e.g., column) in the X matrix.

In one approach, the sparse matrix converter 210 partitions or divides the X matrix into a sub-matrices, and generates, for each sub-matrix, a corresponding set of vectors. For example, the sparse matrix converter 210 generates a first sub-matrix $X_1$ of the X matrix and a second sub-matrix $X_2$ of the X matrix. Then, the sparse matrix converter 210 may generate a first set of vectors $W_1$, $IW_1$, $JW_1$ representing the first sub-matrix $X_1$ and a second set of vectors $W_2$, $IW_2$, $JW_2$ representing the second sub-matrix $X_2$. By dividing or partitioning the X matrix into a plurality of sub-matrices and generating, for each sub-matrix, a corresponding set of vectors, MAC operations can be performed in a parallel or pipeline configuration.

The sparse matrix converter 210 may store the set of vectors (e.g., W vector, IW vector, JW vector) by the sparse matrix vectors storage 220.

Figure 5:
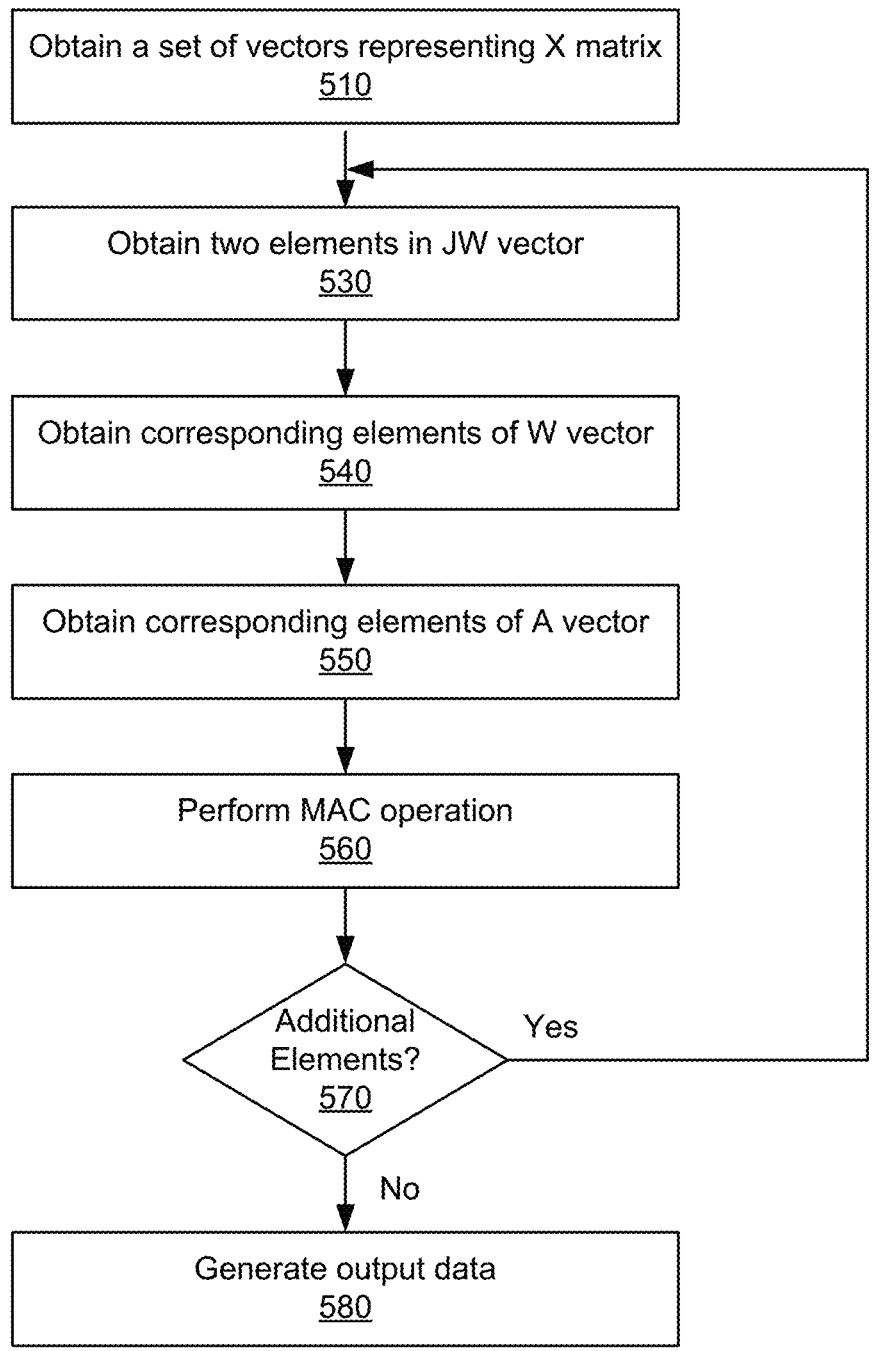
FIG. 5 is a flow chart illustrating a process of performing MAC operation based on a set of vectors representing a sparse matrix, according to an example implementation of the present disclosure.

FIG. 5 is a flow chart illustrating a process 500 of performing MAC operation based on a set of vectors representing a sparse matrix, according to an example implementation of the present disclosure. In some embodiments, the process 500 is performed by the MAC controller 250 of FIG. 2. The MAC controller 250 may perform matrix multiplication of X matrix and input vector A, in an efficient manner according to a sparsity of the X matrix. In some embodiments, the process 500 is performed by other entities.

In some embodiments, the process 500 includes more, fewer, or different steps than shown in FIG. 5.

In one approach, the MAC controller 250 obtains 510 a set of vectors representing the X matrix. The set of vectors may correspond to or represent the X matrix (or sub-matrix) in a CSR format. The set of vectors may include W vector 222, IW vector 224, and JW vector 226 from the sparse matrix vectors storage 220. The W vector 222 may include non-zero elements of the X matrix. The IW vector 224 may indicate a number of non-zero elements for each row of the X matrix. The JW vector 226 may indicate a location (e.g., column) of each of the non-zero elements of the X matrix. The set of vectors may be predetermined before deployment of the sparse matrix multiplier 200. Additionally or alternatively, the set of vectors may be generated or adjusted periodically or dynamically.

In one approach, the MAC controller 250 obtains 530 two elements in JW vector indicating locations of the non-zero elements. The MAC controller 250 may obtain first two elements in the JW vector. In one approach, the MAC controller 250 obtains 540 corresponding elements of W vector. In one approach, the MAC controller 250 obtains 550 corresponding elements of A vector. Referring to the example in FIG. 3, if the X matrix has a first row [0000], a second row [5200], a third row [0030], and a fourth row [0400], the MAC controller 250 can obtain the W vector [5234] including non-zero elements of the X matrix, IW vector [0211] indicating, for each row of the X matrix, a number of non-zero elements, and the JW vector [0121] indicating column locations of the non-zero elements. The MAC controller 250 may identify two or more elements corresponding to the same row in the X matrix according to the IW vector. For example, the MAC controller 250 may determine that first two elements of the JW vector correspond to two elements in the X matrix for the same row, because the first element of the JW vector is [0] and the second element of the JW vector is [2]. The MAC controller 250 may also retrieve corresponding elements in the W vector. For example, the MAC controller 250 obtains the first two elements of the W vector corresponding to the first two elements of the JW Vector. The MAC controller 250 may also obtain corresponding elements of the input vector A according to elements of the JW vector. For example, the MAC controller 250 may apply the elements (e.g., JW[0], JW[1]) of the JW vector to the input vector storage 230, and obtain corresponding elements (e.g., A[JW[0]], A[JW[1]]) of the input vector A.

In one approach, the MAC controller 250 performs 560 MAC operation (or dot product operation). The MAC controller 250 may apply non-zero elements obtained from the W vector and corresponding elements obtained from the input vector A. The MAC controller 250 may apply the obtained elements to a MAC circuitry (e.g., MAC array 240) to perform MAC operation.

In one approach, the MAC controller 250 determines 570 whether additional non-zero elements of the matrix X exist or not. If additional elements exist in the W vector, then the MAC controller 250 may return to step 530, and repeat the process for subsequent elements of the W vector. In one aspect, the MAC controller 250 may add or accumulate corresponding MAC operation results. The MAC controller 250 may refer to the mapping information indicating associated MAC operation results to add or accumulate, and add associated MAC operation results. For example, the MAC controller 250 may add MAC operation results corresponding to the same row of the X matrix. For example, the MAC controller 250 may obtain a first MAC operation result corresponding to two elements for a row of X matrix and obtain a second MAC operation result corresponding to different two elements for the same row of X matrix, and add or accumulate the first MAC operation result and the second MAC operation result. If no additional element exists in the W vector, the MAC controller 250 may generate 580 output data. In one example, the input vector is or corresponds to audio stream data of speech, and the output data is or corresponds to text of the speech in the audio stream data. In some embodiments, additional processing (e.g., filtering, etc.) can be performed to generate text and display the text in real time.

Advantageously, computational efficiency for performing MAC operations can be improved by reducing a number of computations (e.g., multiplications and accumulations). In one implementation, matrix multiplications for a matrix including a large number of elements (e.g., over thousand) may include a large number of multiplications and additions. In one aspect, sparsity of a matrix is exploited to reduce a number of computations. According to a set of vectors representing the X matrix, MAC operations can be selectively performed for non-zero elements of the X matrix without performing a full matrix multiplication. Accordingly, a fewer number of MAC operations can be performed by obviating MAC operations associated with zero-elements of the base matrix. By reducing a number of MAC operations, complex matrix multiplications can be performed in a prompt manner with reduced power.

In one approach, the process 500 can be performed in a parallel or pipeline configuration. For example, X matrix can be divided into a plurality of sub-matrices, and each sub-matrix can be converted into a corresponding set of vectors. Then, MAC operations can be performed for each sub-matrix in a parallel or pipeline configuration. In some embodiments, a variable reduction tree can be implemented to allow accumulation of 1, 2, 4, 8 or 16 results in parallel to support structured sparsity in the form of 1×16, 2×8, 4×4, 8×2 or 16×1 blocks. Through parallel processing, time consumed for performing matrix multiplication can be further reduced.

Figure 6:
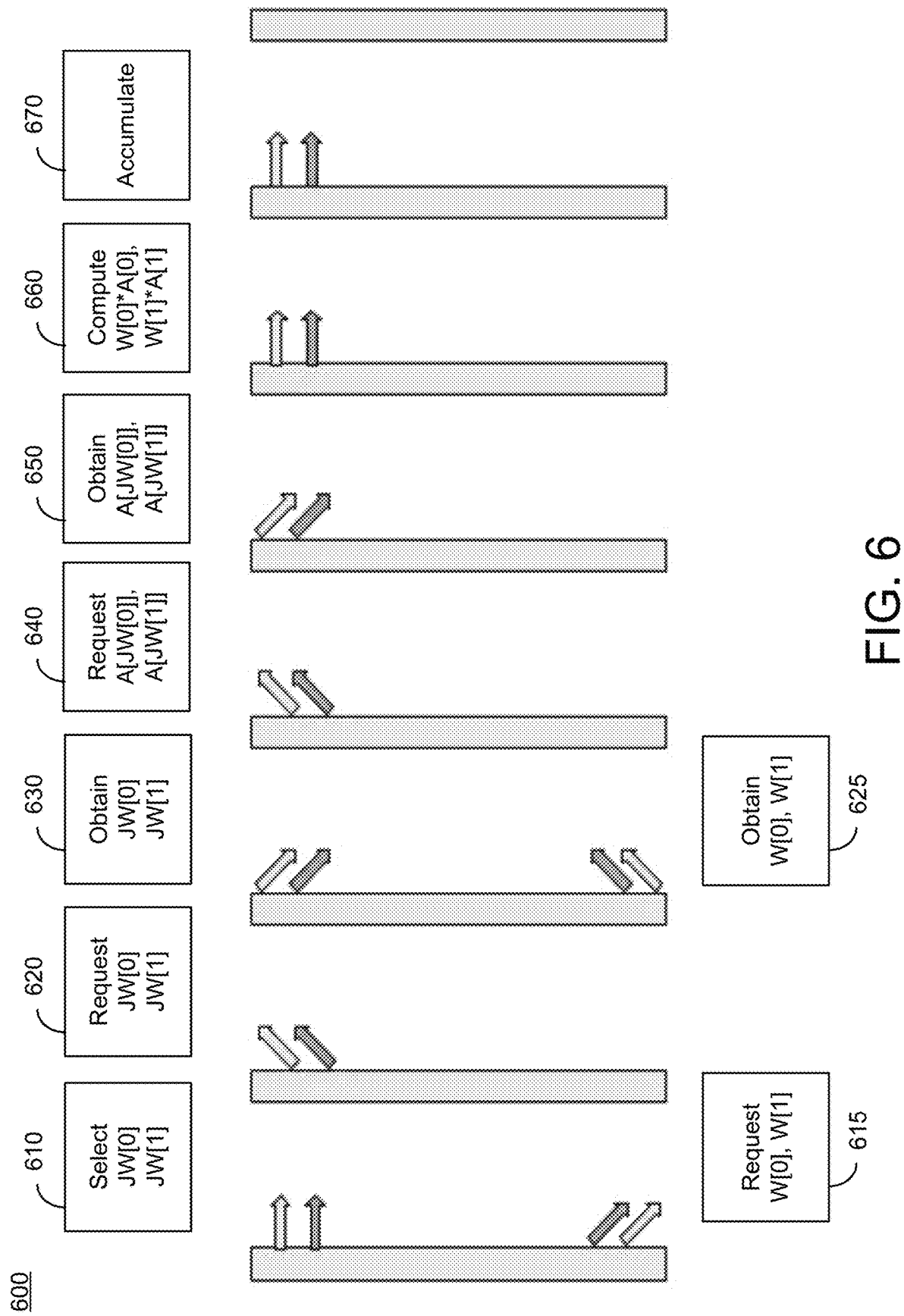
FIG. 6 shows a process of performing MAC operation based on a set of vectors representing a sparse matrix, according to an example implementation of the present disclosure.

FIG. 6 shows a process 600 of performing MAC operation based on a set of vectors (e.g., W vector, IW vector, JW vector) representing a sparse matrix, according to an example implementation of the present disclosure.

In a first epoch 610, the MAC controller 250 selects two elements of the JW vector (e.g., JW[0], JW[1]). The MAC controller 250 may select two elements of the JW vector corresponding to elements in the same row of the X matrix. The MAC controller 250 may identify or determine elements of the JW vector according to IW vector indicating a number of non-zero elements for each row of the X matrix. The MAC controller 250 may also generate an instruction to request 615 or access two corresponding elements of the W vector (e.g., W[0], W[1]). In a second epoch, the MAC controller 250 may generate an instruction to request 620 or access the selected elements of the JW vector. In a third epoch, the MAC controller 250 obtains 630 or receives the selected elements of the JW vector (e.g., JW[0], JW[1]) corresponding elements of the W vector requested. In addition, the MAC controller 250 obtains 625 or receives the requested elements of the W vector (e.g., W[0], W[1]).

In a fourth epoch, the MAC controller 250 may generate an instruction to request 640 or access elements of an input vector identified by the selected elements of the JW vector. For example, the MAC controller 250 provides the obtained elements (e.g., JW[0], JW[1]) as an input to the input vector storage 230. In a fifth epoch, in response to the request, the MAC controller 250 may receive 650 corresponding elements of the input vector A (e.g., A[JW[0]], A[JW[1]]).

In a sixth epoch, the MAC controller 250 may apply the elements of the W vector and the input vector A retrieved to a MAC circuitry (e.g., MAC array 240) to compute 660 or perform multiplications. In a seventh epoch, the MAC controller 250 may add or accumulate 670 the multiplication results.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   identifying, by one or more processors, a first vector including non-zero elements of a base matrix, a second vector indicating a location of each of the non-zero elements of the base matrix, and a third vector indicating, for each row of the base matrix, a corresponding number of non-zero elements;
   determining, by the one or more processors, a first element and a second element of the first vector, according to a first number of non-zero elements of a first row of the base matrix indicated by the third vector, the first element and the second element being the non-zero elements of the first row of the base matrix;
   determining, by the one or more processors, a third element and a fourth element of the second vector, according to the first number of non-zero elements of the first row of the base matrix indicated by the third vector;
   determining, by the one or more processors, i) a fifth element of an input vector indicated by the third element of the second vector, and ii) a sixth element of the input vector indicated by the fourth element of the second vector; and
   causing, by the one or more processors, a multiply-accumulate (MAC) circuitry to perform a dot product according to the first element, the second element, the fifth element, and the sixth element.

2. The method of claim 1, wherein causing, by the one or more processors, the MAC circuitry to perform the dot product includes:
   causing, by the one or more processors, the MAC circuitry to multiply the first element and the fifth element to obtain a first multiplication result;
   causing, by the one or more processors, the MAC circuitry to multiply the second element and the sixth element to obtain a second multiplication result; and
   causing, by the one or more processors, the MAC circuitry to add the first multiplication result and the second multiplication result.

3. The method of claim 1, wherein the third element of the second vector indicates a first column location of the first element of the first vector in the first row of the base matrix and a first corresponding location of the fifth element of the input vector.

4. The method of claim 1, further comprising:
   partitioning, by the one or more processors, a matrix into two or more sub-matrices, wherein the base matrix is one of the two or more sub-matrices.

5. The method of claim 4, further comprising:
   causing, by the one or more processors, another MAC circuitry to perform an additional dot product according to two elements in another one of the two or more sub-matrices, while the MAC circuitry performs the dot product according to the first element, the second element, the fifth element, and the sixth element.

6. A system comprising:
   one or more processors configured to:
      identify a first vector including non-zero elements of a base matrix, a second vector indicating a location of each of the non-zero elements of the base matrix, and a third vector indicating, for each row of the base matrix, a corresponding number of non-zero elements,
      determine a first element and a second element of the first vector, according to a first number of non-zero elements of a first row of the base matrix indicated by the third vector, the first element and the second element being the non-zero elements of the first row of the base matrix,
      determine a third element and a fourth element of the second vector, according to the first number of non-zero elements of the first row of the base matrix indicated by the third vector, and
      determine i) a fifth element of an input vector indicated by the third element of the second vector, and ii) a sixth element of the input vector indicated by the fourth element of the second vector; and
   a multiply-accumulate (MAC) circuitry configured to perform a dot product according to the first element, the second element, the fifth element, and the sixth element.

7. The system of claim 6, wherein the MAC circuitry is configured to perform the dot product by:
  multiplying the first element and the fifth element to obtain a first multiplication result,
  multiplying the second element and the sixth element to obtain a second multiplication result, and
  adding the first multiplication result and the second multiplication result.

8. The system of claim 6, wherein the third element of the second vector indicates a first column location of the first element of the first vector in the first row of the base matrix and a first corresponding location of the fifth element of the input vector.

9. The system of claim 6, wherein the one or more processors are configured to:
  partition a matrix into two or more sub-matrices, wherein the base matrix is one of the two or more sub-matrices.

10. The system of claim 9, further comprising:
  another MAC circuitry configured to perform an additional dot product according to two elements in another one of the two or more sub-matrices, while the MAC circuitry performs the dot product according to the first element, the second element, the fifth element, and the sixth element.

11. A non-transitory computer readable medium storing instructions when executed by one or more processors cause the one or more processors to:
  identify a first vector including non-zero elements of a base matrix, a second vector indicating a location of each of the non-zero elements of the base matrix, and a third vector indicating, for each row of the base matrix, a corresponding number of non-zero elements;
  determine a first element and a second element of the first vector, according to a first number of non-zero elements of a first row of the base matrix indicated by the third vector, the first element and the second element being the non-zero elements of the first row of the base matrix;
  determine a third element and a fourth element of the second vector, according to the first number of non-zero elements of the first row of the base matrix indicated by the third vector;
  determine i) a fifth element of an input vector indicated by the third element of the second vector, and ii) a sixth element of the input vector indicated by the fourth element of the second vector; and
  cause a multiply-accumulate (MAC) circuitry to perform a dot product according to the first element, the second element, the fifth element, and the sixth element.

12. The non-transitory computer readable medium of claim 11, wherein the instructions when executed by the one or more processors that cause the MAC circuitry to perform the dot product includes instructions when executed by the one or more processors cause the one or more processors to:
  cause the MAC circuitry to multiply the first element and the fifth element to obtain a first multiplication result;
  cause the MAC circuitry to multiply the second element and the sixth element to obtain a second multiplication result; and
  cause the MAC circuitry to add the first multiplication result and the second multiplication result.

13. The non-transitory computer readable medium of claim 11, wherein the third element of the second vector indicates a first column location of the first element of the first vector in the first row of the base matrix and a first corresponding location of the fifth element of the input vector.

14. The non-transitory computer readable medium of claim 11, further comprising instructions when executed by the one or more processors cause the one or more processors to:
  partition a matrix into two or more sub-matrices, wherein the base matrix is one of the two or more sub-matrices, and
  cause another MAC circuitry to perform an additional dot product according to two elements in another one of the two or more sub-matrices, while the MAC circuitry performs the dot product according to the first element, the second element, the fifth element, and the sixth element.

15. The method of claim 3, wherein the fourth element of the second vector indicates a second column location of the second element of the first vector in the first row of the base matrix and a second corresponding location of the sixth element of the input vector.

16. The system of claim 8, wherein the fourth element of the second vector indicates a second column location of the second element of the first vector in the first row of the base matrix and a second corresponding location of the sixth element of the input vector.

17. The non-transitory computer readable medium of claim 13, wherein the fourth element of the second vector indicates a second column location of the second element of the first vector in the first row of the base matrix and a second corresponding location of the sixth element of the input vector.

18. The method of claim 1, wherein the second vector indicates a column location of the each of the non-zero elements of the base matrix.

19. The system of claim 6, wherein the second vector indicates a column location of the each of the non-zero elements of the base matrix.

20. The non-transitory computer readable medium of claim 11, wherein the second vector indicates a column location of the each of the non-zero elements of the base matrix.

* * * * *